United States Patent
Kumar et al.

(10) Patent No.: US 10,362,055 B2
(45) Date of Patent: Jul. 23, 2019

(54) SYSTEM AND METHODS FOR ACTIVE BRUTE FORCE ATTACK PROTECTION

(71) Applicant: Blue Jeans Network, Inc., Mountain View, CA (US)

(72) Inventors: Navneet Kumar, Bengaluru (IN); Vikas Chourasiya, Bengaluru (IN)

(73) Assignee: Blue Jeans Network, Inc., Mountain View, CA (US)

( * ) Notice: Subject to any disclaimer, the term of this patent is extended or adjusted under 35 U.S.C. 154(b) by 0 days.

(21) Appl. No.: 15/788,635

(22) Filed: Oct. 19, 2017

(65) Prior Publication Data
US 2019/0052672 A1 Feb. 14, 2019

(30) Foreign Application Priority Data
Aug. 10, 2017 (IN) .............................. 201731028514

(51) Int. Cl.
G06F 21/00 (2013.01)
H04L 29/06 (2006.01)
H04L 9/32 (2006.01)
G06F 16/31 (2019.01)

(52) U.S. Cl.
CPC ........ H04L 63/1466 (2013.01); G06F 16/325 (2019.01); H04L 9/3226 (2013.01); H04L 63/1425 (2013.01)

(58) Field of Classification Search
CPC .................. H04L 9/3226; H04L 63/1425; H04L 63/1466
See application file for complete search history.

(56) References Cited

U.S. PATENT DOCUMENTS

| | | | | |
|---|---|---|---|---|
| 6,173,314 B1 * | 1/2001 | Kurashima | ......... | H04L 12/1818 370/261 |
| 7,606,915 B1 * | 10/2009 | Calinov | .................. | G06F 21/36 709/229 |
| 7,707,621 B2 * | 4/2010 | Walmsley | ............ | B41J 2/04505 380/255 |
| 7,770,008 B2 * | 8/2010 | Walmsley | ............ | B41J 2/04505 380/255 |
| 7,849,320 B2 * | 12/2010 | Raikar | .................... | G06F 21/46 713/182 |
| 9,021,583 B2 * | 4/2015 | Wittenstein | ........... | G06F 21/554 726/22 |

(Continued)

FOREIGN PATENT DOCUMENTS

CA 2815417 A1 11/2014
CN 106656640 A 5/2017

OTHER PUBLICATIONS

International Search Report and Written Opinion dated Oct. 11, 2018, from the ISA—European Patent Office, for International Patent Application No. PCT/US2018/043834 (filed Jul. 26, 2018), 16 pages.

Primary Examiner — Maung T Lwin
(74) Attorney, Agent, or Firm — Ascenda Law Group, PC

(57) ABSTRACT

Embodiments are described for provision of a brute force attack protection service to a middleware service, for example in the context of a distributed computing system receiving requests for connection from remote client devices. The brute force attack protection service may avoid relying upon presenting a Turing challenge at client devices for identifying and handling malicious requests for access or resources at the middleware service.

19 Claims, 5 Drawing Sheets

(56) References Cited

U.S. PATENT DOCUMENTS

| | | | |
|---|---|---|---|
| 9,282,116 B1* | 3/2016 | Rovniaguin | H04L 63/1458 |
| 2004/0181540 A1* | 9/2004 | Jung | G06Q 10/107 |
| 2009/0044251 A1* | 2/2009 | Otake | H04L 63/102 |
| | | | 726/3 |
| 2010/0031315 A1* | 2/2010 | Feng | G06F 21/554 |
| | | | 726/3 |
| 2010/0192201 A1 | 7/2010 | Shimoni et al. | |
| 2011/0185407 A1* | 7/2011 | Perrot | G06F 21/34 |
| | | | 726/6 |
| 2012/0170726 A1* | 7/2012 | Schwartz | H04M 3/38 |
| | | | 379/93.02 |
| 2013/0031598 A1* | 1/2013 | Whelan | G01S 1/725 |
| | | | 726/1 |
| 2014/0282866 A1 | 9/2014 | Jakobsson et al. | |
| 2014/0380418 A1* | 12/2014 | Wang | H04L 63/08 |
| | | | 726/3 |
| 2015/0096020 A1* | 4/2015 | Adams | H04L 63/1458 |
| | | | 726/23 |
| 2016/0057169 A1 | 2/2016 | Honda et al. | |
| 2016/0197937 A1 | 7/2016 | Roth et al. | |
| 2016/0344752 A1* | 11/2016 | Sterne | H04L 63/1416 |
| 2017/0230179 A1* | 8/2017 | Mannan | H04L 9/0897 |
| 2017/0272480 A1* | 9/2017 | Sasaki | H04L 65/4053 |
| 2017/0346809 A1* | 11/2017 | Plotnik | H04L 63/0815 |
| 2018/0004948 A1* | 1/2018 | Martin | H04L 63/1425 |

\* cited by examiner

SYSTEM AND METHODS FOR ACTIVE BRUTE FORCE ATTACK PROTECTION

CROSS REFERENCE TO RELATED APPLICATIONS

This application claims the priority benefit of Indian Application No. 201731028514, filed on 10 Aug. 2017, the disclosure of which is incorporated herein by reference in its entirety.

FIELD OF THE INVENTION

The present invention is directed to providing techniques and systems for protecting a computing system from brute force attacks without requiring a Turing challenge.

BACKGROUND

Cloud-based computing systems are increasingly at risk of security breaches from brute force and other types of attacks designed to gain privileged access to the system. In a brute force attack, single client devices, or groups of client devices, are configured to repeatedly request access to the cloud-based system until access is granted. Each request may iterate through a sequence of possible values for login parameters such as user names and passwords. Because the total number of possible values is typically much larger than the number of registered or correct values for logging in to the system, brute force attacks typically involve a large number of incorrect requests for access before they succeed.

One way to try to stymie a brute force attack is to present the client device with a Turing challenge—for example, a Completely Automated Public Turing test to Tell Computers and Humans Apart (CAPTCHA). Turing challenges such as CAPTCHAs require a human user at the client device to answer a question or provide information in response to an inquiry, puzzle, or problem that is designed to be easy for a human but difficult for a computer program to provide a correct response. In such a system, only client devices that correctly provide a response to the Turing challenge will have their request for access (e.g., a request containing login information) processed, and an automated brute force attack will not be able to submit any of its requests for access. However, having to respond to a Turing challenge with every login can be irritating to human users. There is a need for approaches for protecting against brute force attacks while avoiding annoying human users with a Turing challenge. Such alternative systems and methods for protecting against brute force attacks are described herein.

SUMMARY

Embodiments are described for provision of a brute force protection system for a distributed computing system, such as a cloud service provider. In some embodiments, a brute force protection system is configured to receive a collection of request metadata associated with a current request from a middleware device, wherein the request metadata include a plurality of iterable parameter values. These iterable parameter values may be values for passcodes, meeting identifiers, user identifiers, content management system identifiers, and the like. The system may create one or more request signatures for the current request by replacing the plurality of iterable parameter values associated with the current request with respective placeholders. A representation of the collection of request metadata (or a subset of the collection) and a representation of the one or more request signatures may be saved in a database. The system may also determine one or more counts for the one or more request signatures based on the number of identical request signatures presented to the system or saved in the database. If any of the counts of identical request signatures is greater than a maximum attempt threshold, the request will be determined to be a potential brute force attack request, and an appropriate responsive action will be determined, such as delaying processing of additional requests having the same signature based on the number of received requests with that signature. Such an action and all or some of the request metadata may also be provided to the middleware device. In certain embodiments, the system operates without providing a Turing challenge to client devices.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which.

DETAILED DESCRIPTION

Embodiments of apparatuses, computer systems, computer readable mediums, and methods for protecting against brute force attacks are described herein. In particular, the approaches described here do not require a Turing challenge, and accordingly can operate instead of a Turing challenge. Human users may be annoyed by having to interact with a Turing challenge, and some users may find the Turing challenge to be too difficult. Additionally, using a Turing challenge will cause the login process to take more time than it would without the challenge, which may further annoy human users. Moreover, in some circumstances, a brute force attack may be sophisticated enough to pass a Turing challenge. In such an environment, the approaches described below may be used in addition to a Turing challenge for additional security.

Embodiments described herein operate by identifying certain sequences of erroneous requests as likely to be part of brute force attacks, and responding appropriately.

Figure 1:
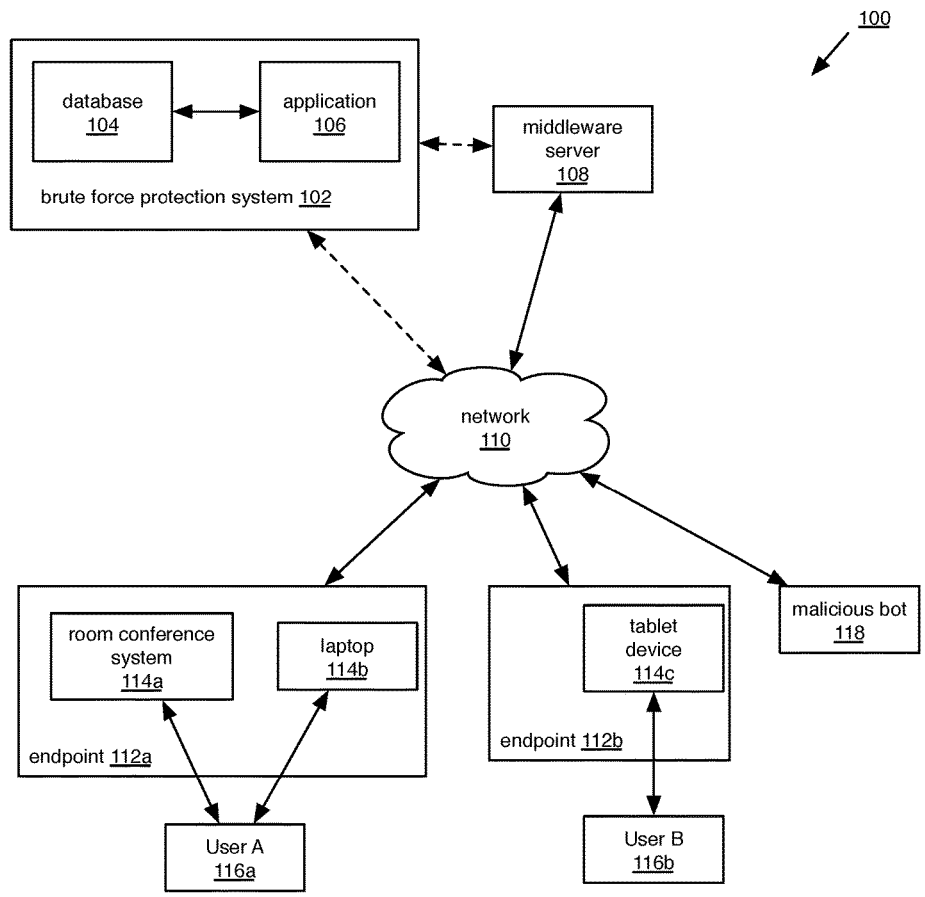
FIG. 1 depicts an exemplary distributed computing system in accordance with some embodiments of the invention.

FIG. 1 depicts an exemplary distributed computing system 100 in accordance with some embodiments of the invention. System 100 is configured with components of a video conferencing service, but in certain embodiments, other types of computing systems involving remote access would also be compatible with the described approaches. System 100 includes a brute force protection system 102 comprising one or more devices including a database 104 and an application 106 that implements the logic of the brute force protection system. System 100 includes a middleware server 108 that is configured to allow remote requests for access over a network 110. Middleware server 108 may provide any computer-based service to client devices, such as providing aspects of a video conferencing service (e.g., receiving, compositing, and providing video streams for video conferencing endpoints). Network 110 may be the internet, a local area network, a wide area network, a telecommunications network, or the like. Brute force protection system 102 is in communication with the middleware server 108. In certain embodiments, brute force protection system 102 may be local to the middleware server 108, for example via an internal network such as a local area network, and in other embodiments, they are in communication via network 110, where network 110 is not a local area network. Middleware server 108 is configured to receive connection requests over network 110 from various remote client devices 114, such as room conference system 114a and laptop 114b (associated, in this example, with video conferencing endpoint 112a), and tablet device 114c, associated with endpoint 112b. Client devices 114 may be associated with human users 116 (e.g., User A 116a and User B 116b). In certain circumstances, a client device may actually be a malicious bot 118, where such a bot is configured to attempt to gain access to middleware server 108 by way of a sequence of automated connection requests (e.g., a brute force attack).

In the example of a video conferencing service provided in part by a middleware server 108, client devices 114 associated with endpoints 112 in a particular video conference will each provide a request to the middleware server 108 to join the video conference (i.e., a request for access), and as part of successfully joining the video conference, the client devices 114 will be associated with endpoints 112 in the conference. The request will contain values for one or more iterable parameters used to identify or authenticate the associated user 116 (e.g., user ID, passcode) and/or the requested item (e.g., video conference meeting ID, content management system ID, passcode). An iterable parameter value (i.e., the value corresponding to the iterable parameter) is a string of characters provided by a client as part of enabling access to or identifying a resource, such as a video conference, an account, a media stream, or a file. In certain embodiments, there may be a pre-defined list of iterable parameters that is selected based on a URI pattern (e.g., the characters "cms/" followed by a 7-digit number to extract a "cms_ID" parameter value), or the requested category of URI (e.g., a request to login or a request for a media resource). Some examples of iterable parameters and their values are: (meeting_id, 900900), (meeting_passcode, 9000), (user_id, 454), (user_password, mysecret), (content_id, 1234), and (content_token, abcd).

In the context of this disclosure, a brute force attack involves repeatedly requesting access to a middleware service or login by formulating and submitting a lengthy sequence of requests that includes values for one or more iterable parameters, where the characters comprising the iterable parameter value(s) are varied with each subsequent request, until access to the middleware is granted. In contrast, a human user may provide an erroneous iterable parameter value via a client device, but if the human user knows or is possession of the correct values, such typographical or other errors will typically be corrected after a small number of follow-on access attempts. Requests may be, for example, for the purpose of authenticating a user (e.g., associated with an authentication operation), or for joining a session, such as a video conferencing session.

Figure 2:
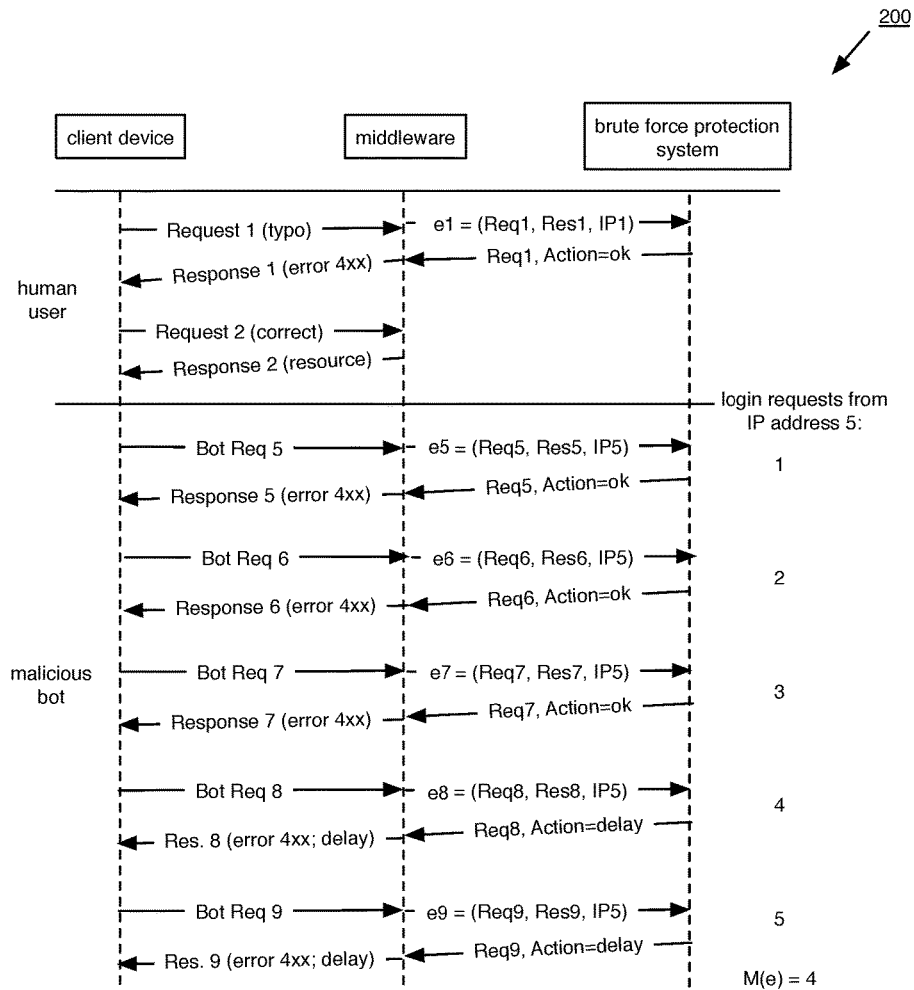
FIG. 2 depicts an exemplary sequence of requests in accordance with some embodiments of the invention.

FIG. 2 depicts a toy example showing how a sequence of requests 200 might be handled by certain embodiments of system 100 including a brute force protection system 102, where some requests are initiated by a human user 116, and others are initiated by a malicious bot 118. Beginning with Request 1, the human user submits a request via a client device 114 for access to middleware 108. Request 1 contains a typographical error in an iterable parameter value, such as a mistyped passcode. The middleware begins to process Request 1, but the resulting Response 1 status is an error code (e.g., "401 unauthorized"). Errors in an iterable parameter value should result in an erroneous response status, such as a response status in the 400 series (e.g., 401 unauthorized, 403 forbidden, 404 not found, and the like). Because the Response 1 status resulted in an error, the middleware provides Request 1 to a brute force protection system 102 for evaluation to predict whether Request 1 is likely to be part of a brute force attack. Request 1, Response 1, and the internet protocol (IP) address are packaged as an Event 1 (e1) and provided to the brute force protection system. Event 1 is evaluated as described below in connection with FIG. 4, by determining whether a maximum number of events M(e) sharing the same request signature have been observed by the brute force protection system 102. Because Event 1 is associated with the first request having a first signature (and less than the exemplary M(e) threshold of 4 in FIG. 2), the system 102 returns Request 1 to the middleware with an action indicating that Event 1 is not associated with a brute force attack (e.g., the action may be to provide a response to the client or otherwise treat the associated request as a safe request). Accordingly, the middleware provides Response 1 to the client device with the appropriate error code. In certain embodiments, the middleware may provide a customized response in situations where the response is erroneous but not identified as a brute force attack.

Continuing with sequence of requests 200, the human user may then correct the erroneous iterable parameter value (e.g., by entering the passcode correctly at the client device), and submit the corrected value as part of Request 2. Because Request 2 does not generate an error code, the middleware provides the corresponding response (e.g., the requested resource) and is accordingly granted access.

Continuing with sequence of requests 200, a malicious bot 118 may provide a series of Requests 5 through 9 to the middleware as components of Events 5 through 9. Malicious bot 118 is configured to guess values for each of one or more iterable parameters that are required for access to a requested resource at the middleware. Because the potential valid parameter space is so large, each of guesses five through nine presented via requests 5 through 9 are incorrect. (In practice, the probability that the parameter values in a brute force attack are wrong is very high because the space complexity of the parameters is large.) Metadata regarding each incorrect guess/request is provided by the middleware to the brute force protection system upon causing an erroneous response. Because, in this example, attempt threshold M(e) is 4, the first three Requests 5 through 7 are treated similarly to Request 1, even though each of Requests 5 through 7 are associated with the same request signature. After Request 8 is provided to the brute force protection system, the system has reached the attempt threshold M(e) of 4, and the system 102 associates the request signature of Requests 5-9 with a likely brute force attack, and provides an appropriate Action to the middleware along with the corresponding Request, e.g. as described below in connection with process 300. For example, the Action for a Request that is associated with a brute force attack may be to delay providing the corresponding response to the client device/malicious bot. For example, the middleware may delay providing the response by an amount of time that is proportional to or based on the number of requests associated with the same request signature. Such a delay may slow down the malicious bot's ability to submit additional guesses/requests to the point where the attack becomes impractical, while still allowing a human user to continue trying to log in. In the example of FIG. 2, the malicious bot is associated with the same IP address ("IP5"), but in certain embodiments, multiple IP addresses could be associated with the same brute force attack.

Figure 3:
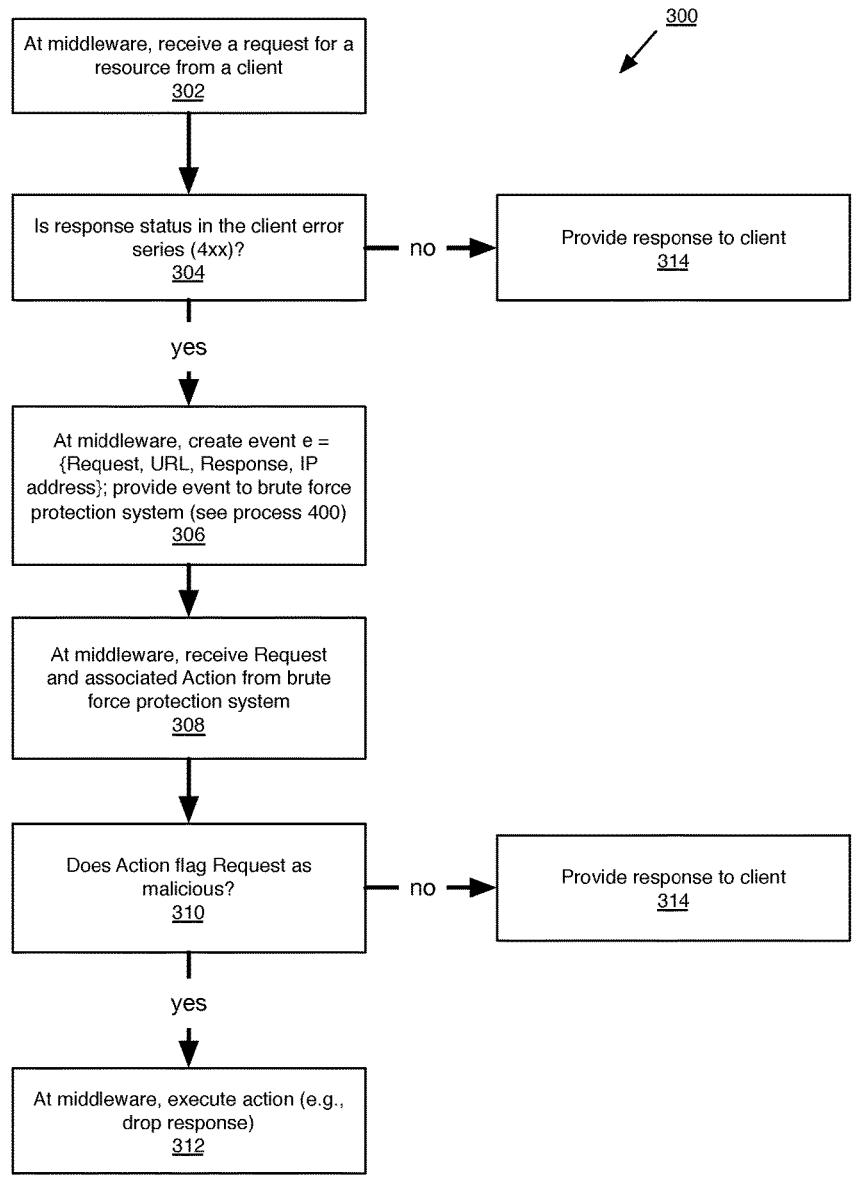
FIG. 3 shows a flow chart for an exemplary process concerning providing brute force protection in accordance with some embodiments of the invention.

FIG. 3 shows a flow chart for an exemplary process 300 concerning providing brute force protection. First, at a middleware device, such as middleware server 108, a request for access to a resource is received (302). The request is provided by a client device 114. The middleware device either processes the request or provides the request to another device for processing, receiving its result. The middleware determines whether the response resulting from processing the request includes a client error series code (e.g., 401 unauthorized, 403 forbidden, 404 not found, and the like) (304). If there is no error (e.g., the response status is not in the 400 series), the response is provided to the requesting client (314). If there is an error, the middleware creates an event object. The event may include extracted information associated with the request and response—for example, a Request (e.g., information extracted from the request such as the request method (GET, POST, etc.), the requested resource or uniform resource identifier (URI or URL), the request header, and the request body), and may additionally include a Response (e.g., the response header and response status) and the client internet protocol (IP) address. The event object is then provided to the brute force protection system 102 for processing as described below in process 400 (306). The middleware next receives the result of the processing by the brute force protection system—for example, it may receive the Request and an associated Action (306). In example process 400, the Action is used to indicate whether the Request is predicted as associated with a likely brute force attack or is safe, for example by providing an appropriate Action for the middleware to perform (310). Accordingly, in one example, the Action may indicate that the Request is safe or unlikely to be malicious, and that a response (e.g., including the error status) should be provided to the client device (314). If the Request was determined to be likely to be malicious, the Action may be to drop the Response (i.e., to not provide any response to the requesting client device) (312). In certain embodiments, the Action may be to delay providing a response by a constant time (e.g., delay by 2 seconds), to use a linear delay in providing the response (e.g., delay by the number of failed attempts before now multiplied by a constant time, such as 2 seconds), to drop the response, to provide the response without delay, to block the requestor's access to the requested resource and provide a secondary access method (e.g., lock the user account and email the resource owner with a link providing access), to block the requestor for this and future requests (e.g., if the requestor can be uniquely identified, then block access from that source—for example, if an access token is mandatory for each request to the middleware, block requests using that access token); to provide a cipher challenge (i.e., provide a non-interactive challenge to the client that is not exposed to the human user and therefore not a Turing test—for example, the client CPU must take time to solve the challenge and respond with an answer, and set the complexity of the cipher challenge to be proportional to the number of failed attempts). In certain embodiments, the Action may indicate that a particular iterable parameter is being targeted by a brute force attack, and instruct the middleware to respond appropriately—for example, for existing accounts or events, values for the targeted parameter may be reset or require resetting in accordance with more stringent security requirements, such as requiring a longer or more complex parameter value. In another example, for new accounts or events, more stringent requirements may be applied to new values for the targeted iterable parameter. In certain embodiments, the Action may include notifying an administrator about the targeted parameter and/or brute force attack.

Figure 4:
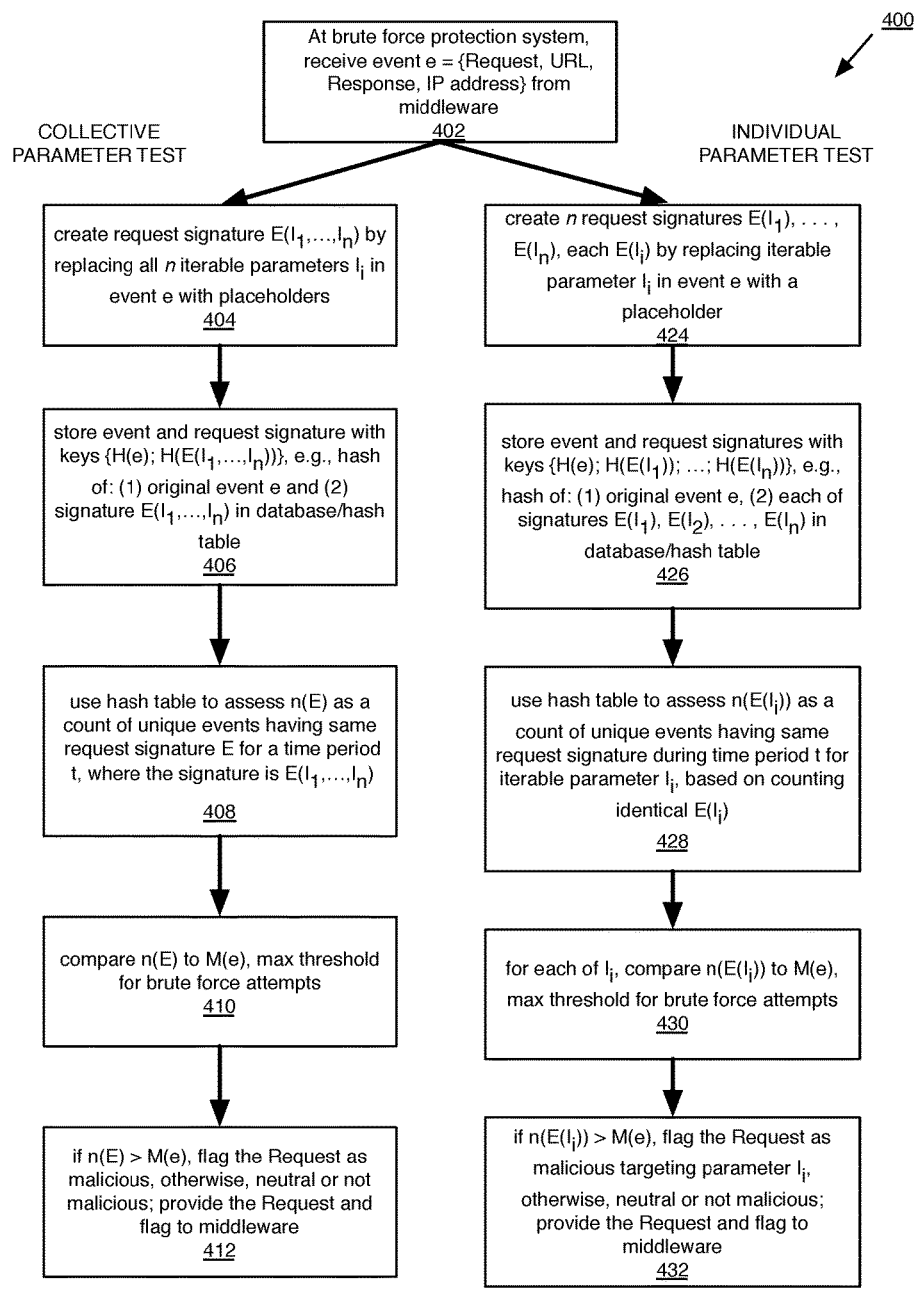
FIG. 4 shows a flow chart for an exemplary process concerning providing brute force protection in accordance with some embodiments of the invention.

FIG. 4 shows a flow chart for an exemplary process 400 concerning providing brute force protection. The process includes two options: first, a determination based on all iterable parameters, in which the brute force protection system 102 evaluates whether or not any of the iterable parameters in the request are being targeted by a brute force attack (i.e., the "collective parameter test," steps 404, 406, 408, 410, 412), and second, a determination whether one or more particular iterable parameters is being targeted by a brute force attack (i.e., the "individual parameter test," steps 424, 426, 428, 430, 432). Either option may be performed as an alternative, or both can be evaluated in parallel. As used herein, the targeted iterable parameter refers to the iterable parameter associated with varying values in requests involved in a brute force attack, as opposed to an iterable parameter associated with values that do not change across the series of requests involved in the attack.

In step 402 of process 400, a brute force protection system 102 receives an event object from a middleware device or service. In this example, the event object includes a collection of event metadata—for example, information extracted from a request from a client device (a Request), a URL for the requested resource, information extracted from a response resulting from processing the request at the middleware (a Response) and the IP address associated with the client device.

In the collective parameter test approach for estimating, as a group, whether any parameter of a group of parameters is being targeted in a brute force attack, an initial step is to determine a request signature associated with the event object (or a subset of its components) (404). The request signature is created by replacing each of the iterable parameters in the event or a subset of the event, such as the Request, with a placeholder. For example, the request signature may be based on the Request. If there are n different iterable parameters in the Request, the resulting single signature may contain n placeholders. A placeholder may be, for example, iterable parameter names (such as "passcode", "meetingID", or "cmsID"), or categories of parameters that are associated with the parameter values such as "identifier", or "passcode", so long as the same placeholder is used to replace the different values across different Requests corresponding to the same iterable parameter. In certain embodiments, multiple request signatures may be determined for a single event, for example in order to base the request signature on different components of the event, such as including versus not including the IP address. Examples of an event and a corresponding request signature are provided below.

```
Example event =
{
    "ip": "10.1.1.1",
    "url":
"https://website.com/seamapi/v1/user/117311/cms/1649979?access_token=b139d16852f843e2a6
f1c983818efe62",
    "request": {
        "method": "POST",
        "headers": {
            "content-type": "json",
            "User-Agent": "Mozilla"
        },
        "body": {
            "meeting_id": 900900,
            "passcode": 9000
        }
    },
    "response": {
        "status": 401,
        "headers": {
            "content-type": "json",
            "User-Agent": "Mozilla"
        }
    }
}
    Example request signature based on the example event =
{
    "ip": "10.1.1.1",
    "url":
"https://website.com/seamapi/v1/user/:userID/cms/:cmsID?access_token=b139d16852f843e2a6f
1c983818efe62",
    "request": {
        "method": "POST",
        "headers": {
            "content-type": "json",
            "User-Agent": "Mozilla"
        },
        "body": {
            "meeting_id": ":meetingID",
            "passcode": ":passcode"
        }
    },
    "response": {
        "status": 401,
        "headers": {
            "content-type": "json",
            "User-Agent": "Mozilla"
        }
    }
}
```

In the example request signature above, values for the iterable parameters userID, cmsID, meetingID, and passcode were replaced with placeholders based on the parameter names, and the request signature is based on the entire event. In certain embodiments, the request signature may be based on one or more components of the event, for example, based on the Request, the Request.body and the URL, or the Request and the client device IP address, and the like. In a brute force attack, malicious bot(s) 118 will vary the value for an iterable parameter across a series of requests (e.g., captured as a series of events), while ordinarily keeping the other features of the requests constant. Accordingly, after replacing the value of all iterable parameters with a placeholder to generate a request signature, each of the series of request signatures associated with the attack will be identical. In certain embodiments, an unmodified request signature is additionally created based on the original event information, without first replacing the values of iterable parameters with placeholders.

In certain embodiments, a single attack may be associated with requests originating from multiple IP addresses based on similar request characteristics. For example, the system 102 may track geo-colocation of requests, request fingerprints (based on all or parts of the header from each request), request sequence patterns (e.g., tracking the time differences between consecutive requests). New requests that match these request characteristics may be identified as associated with the same attack, despite being associated with different IP addresses. When allowing for multiple IP addresses to be associated with an attack, in certain embodiments, the portion of the event used to determine the request signature (e.g., as determined in step 404) will not include the IP address.

Continuing with the collective parameter test option of process 400, the brute force protection system 102 is configured to store the event and the request signature associated with the event and/or the event's components in a database 104 (406). In certain embodiments, the unmodified request signature based on the original event information is also stored in the database. In certain embodiments, the current event e and request signature E are stored in a hash table using the hash of a request signature E as a key. In some examples, the result of a hash function of event e is also used as a key for accessing event e in the table. The database of prior events and signatures is used to evaluate a count of the number of times the system 102 has observed the current request signature E (408). In certain embodiments, the system 102 additionally tests whether the current unmodified request signature is different across the different attempts—so long as the unmodified request signature changes while the request signature (i.e., containing placeholders) does not change, these circumstances indicate a brute force attack. If the unmodified request signature does not change, this could indicate a different type of attack, such as a Denial of Service attack. In certain embodiments, using a hash table allows the database to keep a running tally of the count for each request signature and access that count with efficient O(1) performance, by incrementing a count value with each new event having signature E as a key. In another embodiment, events/signatures may be stored in a linked list retrieved by the key for the hash table, and counting certain of the identical request signatures may involve traversing that list. In certain embodiments, the count of identical request signatures may be limited to events occurring during a certain time period t ending at the current time or the time event e was received, such as t ranging between one minute and one hour, such as 5 minutes, 7 minutes, 10 minutes, or 1 hour. In certain embodiments, the time period for the count may depend on the category of event e. For example, a login event category may be associated with a longer time period, such as ten minutes, as login requests may occur with a relatively low frequency, and an event such as a request for access to a recording or a media item may be associated with a shorter time period, such as one minute or five minutes. For example, 20 failed login attempts in ten minutes is a potential brute force attack, but 20 failed media access attempts in five minutes is less likely to be a brute force attack.

Process 400 may be configured to use a threshold M(e), for assessing a maximum number of request attempts, above which a request signature will be treated as if it were associated with a malicious brute force attack request (410). Accordingly, if the count of identical request signatures for the current event (e.g., n(E)) is below the threshold, the request associated with the event will be treated as safe, or, for example, associated with an Action causing the middleware to treat the request in an ordinary manner, such as providing the default error response generated by the middleware. If the count is above the threshold, the request may be flagged as malicious, or associated with an Action instructing the middleware to treat the request as part of a brute force attack. In certain embodiments, the threshold may range between 25 and 50 attempts (e.g., observed during a one-minute time period t). In certain embodiments, the time period t and attempt threshold M(e) (or the classification/determination of an attack more generally) may be set according to an event-type-dependent rate threshold, such as 2 failed attempts per minute for a login event type, and 4 failed attempts per minute for a media access request event type. In certain embodiments, the threshold may be set based on the length or complexity of one or more of the iterable parameters associated with the event type, where the event type may be a category of client device request such as a request to join a videoconference, a request to login to a system, and the like. For example, an above-average human typing speed is 200 characters per minute. Then for an iterable parameter associated with values having an average of 8 characters, a human could make a maximum of 25 attempts per minute, ignoring other factors such as network round-trip time. For an iterable parameter having a longer average value length (e.g., 10 characters), a fast-typing human could make a smaller number of attempts per minute (e.g., 20 attempts per minute). Accordingly, a longer iterable parameter might be associated with a lower threshold such as a count of 20 attempts. Where an iterable parameter is associated with lower complexity requirements (e.g., the characters are all integers between 0 and 9), the threshold may be set to be lower than the threshold for a parameter value that is required to be comprised of numbers, symbols, and letters, because the former parameter value is likely to be guessed within a shorter number of attempts compared to the latter. The resulting flag or Action, and Request or event, may then be returned to the middleware (412).

In the individual parameter test approach for estimating whether any iterable parameter in particular is being targeted in a brute force attack, and if so, which parameter is targeted, an initial step is to determine a request signature associated with the event object (or a subset of its components), this time determining at least one request signature for each potential iterable parameter (424). In certain embodiments, multiple request signatures may be determined for a single iterable parameter, for example in order to base the request signature on different components of the event, such as including or not including the IP address (i.e., with the IP address included, only brute force attacks from the same IP address would be detected). The request signatures are created by, for each iterable parameter $I_i$, generating a request signature associated with replacing instances or values of $I_i$ in event e with a placeholder. Stated another way, only one iterable parameter is replaced per request signature, as opposed to replacing all the iterable parameters in an event as with the collective parameter option. In certain embodiments, signatures may be generated only for a subset of iterable parameters present in the event, as well as an unmodified request signature. Each request signature is stored in a database, for example in a hash table in which the hash of each request signature is a key for accessing the request signature and/or associated event in the table (426). With each new event e, the database of prior signatures (e.g., hash table) is used to obtain a count for the number of times each request signature for each iterable parameter has been observed, resulting in a separate count corresponding to a signature for each iterable parameter (e.g., $n(E(I_i))$) (428). In some embodiments, the count is limited to a time period, for example, events associated with a date falling within the time period t. Each count (associated with a parameter) is compared to a maximum attempt threshold (430). In certain embodiments, request signatures for certain parameters are associated with a particular threshold, and in other embodiments, the same threshold is used for all parameters/request signatures. Where a count associated with a certain parameter exceeds the threshold, the associated request is identified as likely part of a brute force attack targeting the certain parameter (432). The brute force protection system 102 may then notify the middleware regarding the attack on the parameter. In certain embodiments, the system may instruct the middleware with an Action for handling the event-associated request from the client device, where the Action is determined by whether or not any count exceeds a corresponding threshold.

Figure 5:
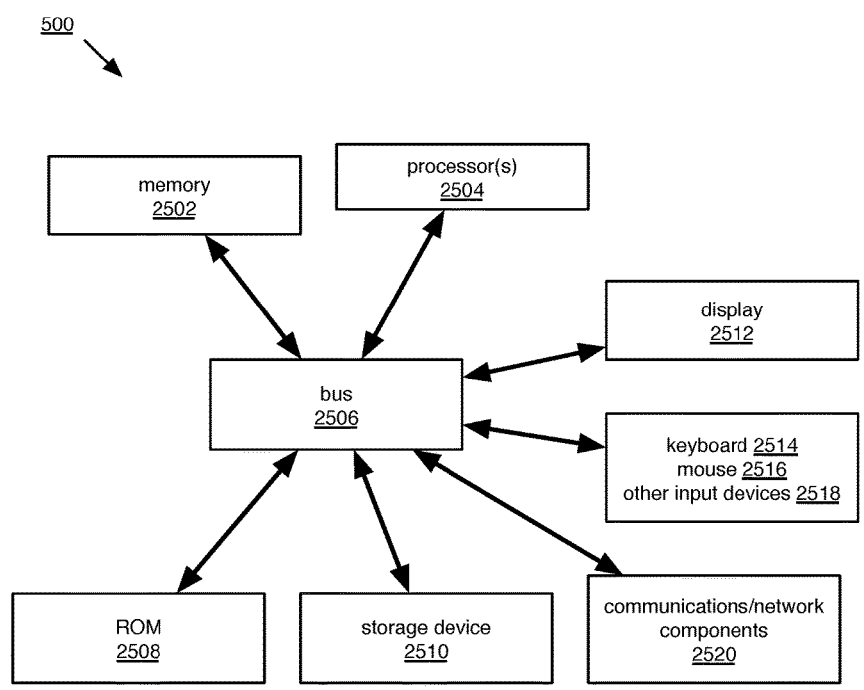
FIG. 5 shows a block diagram of an exemplary computing system in accordance with some embodiments of the invention.

FIG. 5 shows a block diagram showing an exemplary computing system 500 that is representative any of the computer systems or electronic devices discussed herein. Note that not all of the various computer systems have all of the features of system 500. For example, systems may not include a display inasmuch as the display function may be provided by a client computer communicatively coupled to the computer system or a display function may be unnecessary.

System 500 includes a bus 2506 or other communication mechanism for communicating information, and a processor 2504 coupled with the bus 2506 for processing information. Computer system 500 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 500 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 500 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 500 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A brute force protection system, comprising:
   a processor;
   a storage device communicatively coupled to the processor; and
   a set of instructions on the storage device that, when executed by the processor, cause the processor to:
      receive a collection of event metadata associated with a current failed request from a middleware device, wherein the collection of event metadata comprises one or more iterable parameter values and the one or more iterable parameter values include at least a first user identifier value;
      create a first request signature for the current failed request by replacing, in the collection of event metadata, the one or more iterable parameter values with one or more placeholders, wherein the replacing includes replacing the first user identifier value with a user identifier placeholder that is identical for all replaced user identifier values;
      store a representation of the collection of event metadata and a representation of the first request signature in a database;
      determine a count for the first request signature, wherein the count is a total number of times the brute force protection system has created the first request signature within a set time period including the creation of the first request signature for the current failed request;
      if the count is greater than a maximum attempt threshold; if so, determine a responsive action for treating the current failed request as part of a brute force attack; otherwise, determine a neutral action for treating the current failed request as an ordinary failed request; and
      provide the responsive or neutral action and at least a portion of the collection of event metadata to the middleware device.

2. The brute force protection system of claim 1, wherein no Turing challenge information is used by the brute force protection system or received at the brute force protection system directly or indirectly from a client device.

3. The brute force protection system of claim 1, wherein the collection of event metadata includes two or more of an IP address, uniform resource identifier (URI), request header, and a body.

4. The brute force protection system of claim 1, wherein the one or more placeholders are iterable parameter names or categories of iterable parameters that are associated with the one or more iterable parameter values.

5. The brute force protection system of claim 1, wherein the current failed request is associated with an authentication operation or an authorization option.

6. The brute force protection system of claim 1, wherein the current failed request is a request to join a session.

7. The brute force protection system of claim 1, wherein the database includes a hash table.

8. The brute force protection system of claim 1, wherein the responsive or neutral action is selected from: providing a response to a client, not providing the response to the client, and delaying the providing of the response to the client.

9. The brute force protection system of claim 1, wherein the one or more iterable parameter values additionally includes a first passcode value, and wherein the replacing further includes replacing the first passcode value with a passcode placeholder that is identical for all replaced passcode values.

10. The brute force protection system of claim 1, wherein the one or more iterable parameter values additionally includes a first meeting identifier value, and wherein the replacing further includes replacing the first meeting identifier value with a meeting identifier placeholder that is identical for all replaced meeting identifier values.

11. The brute force protection system of claim 1, wherein the one or more iterable parameter values additionally includes a first content management system identifier value, and wherein the replacing further includes replacing the first content management system identifier value with a content management system identifier placeholder that is identical for all replaced content management system identifier values.

12. A method for providing a brute force protection service, comprising:
   at a brute force protection device, receiving a collection of event metadata associated with a current failed request from a middleware device, wherein the collection of event metadata comprises one or more iterable parameter values and the one or more iterable parameter values include at least a first user identifier value;
   creating a first request signature for the current failed request by replacing, in the collection of event metadata, the plurality of one or more iterable parameter values with one or more placeholders, wherein the replacing includes replacing the first user identifier value with a user identifier placeholder that is identical for all replaced user identifier values;
   storing a representation of the collection of event metadata and a representation of the first request signature in a database;
   determining a count for the first request signature, wherein the count is a total number of times the brute force protection system has created the first request signature within a set time period including the creation of the first request signature for the current failed request;
   if the count is greater than a maximum attempt threshold, determine a responsive action for treating the current failed request as part of a brute force attack; otherwise, determine a neutral action for treating the current failed request as an ordinary failed request; and
   by the brute force protection device, providing the responsive or neutral action and at least a portion of the collection of event metadata to the middleware device.

13. The method of claim 12, wherein no Turing challenge information is used by the brute force protection device or received at the brute force protection device directly or indirectly from a client device.

14. The method of claim 12, wherein the collection of event metadata includes two or more of an IP address, uniform resource identifier (URI), request header, and a body.

15. The method of claim 12, wherein the one or more placeholders are iterable parameter names or categories of iterable parameters that are associated with the one or more iterable parameter values.

16. The method of claim 12, wherein the current failed request is associated with an authentication operation or an authorization option.

17. The method of claim 12, wherein the current failed request is a request to join a session.

18. The method of claim 12, wherein the database includes a hash table.

19. The method of claim 12, wherein the responsive or neutral action is selected from: providing a response to a client, not providing the response to the client, and delaying the providing of the response to the client.

* * * * *